Patented Oct. 20, 1931

1,828,429

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

METHOD OF TREATING OILS TO REMOVE SUSPENDED IMPURITIES

No Drawing.   Application filed October 8, 1928.   Serial No. 311,239.

This invention is a method of treating oils, to remove the impurities therefrom.

Attempts have heretofore been made to reclaim used oils such as by removing therefrom the mechanically suspended solid impurities which have been picked up while in use, but as far as is known no method has been heretofore devised for removing the fine carbon particles, except by distillation. In fact, it is impossible to filter there particles from the oil by any known method prior to the present invention, except by complete distillation. One of the objects of the invention is to provide for an effective separation of contaminating solids which may be suspended in the oils to be treated, such solids including among other things the fine carbon particles, the gummy or rosin constituents, and the like. A further object is to provide for the bleaching of oils which have been previously subjected to the so-called "acid treatment".

The invention will be hereinafter fully set forth and particularly pointed out in the claims.

In carrying out the method of purification which constitutes the invention, the oil to be treated is subjected to the action of finely powdered calcium sulphate brought into contact with the oil in suitable manner. The oil is preferably heated to carry off any volatile constituents such as gasoline in used crank case oil, and the calcium sulphate may be deposited therein and allowed to settle without permitting any substantial reduction in the oil temperature, or if desired the volatile constituents may be removed after the oil has been subjected to the calcium sulphate treatment.

In practice any desired quantity of the calcium sulphate may be deposited into the oil being treated, the amount depending upon the volume of oil to be acted upon, for instance, used crank case oils. The instant that calcium sulphate is deposited into the oil, its weight slowly carries it to the bottom, and during this settling it appears to attract the mechanically suspended solids carried by the oil and to precipitate them instantly. In other words said impurities fall with the calcium sulphate. The quantity of calcium sulphate to be used is therefore dependent largely upon the condition of the oil, but no more is required than that which insures complete precipitation, an effect which is quickly visible to the naked eye, although an excess of the calcium sulphate does no damage. That is, no fixed specific quantity of calcium sulphate may be stated in advance, the selection being more or less empirical, except that sufficient quantities are added from time to time until complete precipitation is obtained. After complete precipitation of the impurities has been obtained, the purified oil may be decanted, filtered or separated from the mixture of the deposited substances and the calcium sulphate in any desired or well known manner.

In lieu of depositing the calcium sulphate into the oil as above described, the contaminated oil may be filtered through a bed containing calcium sulphate, the effect of which appears to result in an attraction of the impurities by the calcium sulphate, and a separation from the oil at the same time.

Used crank case oils, cylinder oils, etc., and other contaminated oils are quickly purified by the method above described. The calcium sulphate appears to have an affinity for the fine carbon particles which cannot ordinarily be removed except by distillation, and apparently causes them to assume a condition which permits ready removal thereof by filtration. In other words, the suspended solids not only seem to be attracted to the calcium sulphate but they also appear to be attracted to each other to produce small masses which are readily visible to the naked eye. Gummy substances or rosins which are often suspended in oils are also similarly precipitated. It is to be understood, however, that just what takes place is not precisely known, except that some kind of a change occurs in the condition of the suspended impurities upon bringing the calcium sulphate in contact therewith. Water or aqueous vapor which is often found in used crank case oil apparently combines with a portion of the calcium sulphate, but this reaction apparently does not interfere in any manner with the other functions of the calcium sulphate.

It has also been found that calcium sulphate will also bleach oil which has been subjected to what is known as the "acid treatment". This treatment consists of subjecting oil to the action of sulphuric acid, and as is well known, it is almost impossible to prevent burning the oil during this treatment. The solid particles burned oil remain in suspension and naturally discolor the finished product, but by bringing this acid treated oil into contact with calcium sulphate, the burned particles are immediately acted upon in apparently the same manner as other impurities are, with the result that a clarified oil is produced, readily separable from the burned particles, and possessing approximately the same or better specific gravity than the original oil.

While it is preferred for the purposes of this invention to employ calcium sulphate, either in the form of plaster of Paris or gypsum, the invention is not limited in this particular because other calcareous cements may be employed in lieu thereof, such as natural cement, Portland cement, and the like. Therefore, wherever the term calcium sulphate is used in this specification and the appended claims, it is to be understood that the above mentioned substances are to be considered as equivalents thereof and within the spirit of the invention. It is also to be understood that although used crank case oil has been described in a specific example of the method here involved, the invention is not limited thereto, but is applicable to all kinds of oil, whether used or unused, in which finely divided impurities are held in suspension.

The advantages of the invention will be readily understood by those skilled in the art of purifying oils. A most important advantage is that by the use of calcium sulphate the impurities may be removed by a very simple and inexpensive method, resulting in the production of an exceedingly high grade of oil, without any substantial loss in bulk and without adversely affecting its viscosity.

Having thus explained the nature of the invention and described an operative manner of constructing and using the same, although without attempting to set forth all of the forms in which it may be made, or all of the forms of its use, what is claimed is:—

1. The method of treating oils to remove solids which are mechanically suspended therein comprising bringing the oil into contact with calcium sulphate unassociated with other materials, so as to attract the suspended particles and render them readily separable from the oil, the proportion of calcium sulphate required to clarify said oil being determined by the extent of precipitation of the solids, as the oil and calcium sulphate are brought into contact, and finally separating said solids from the oil.

2. The method of treating oils to remove solids which are mechanically suspended therein comprising precipitating said solids by depositing calcium sulphate into a body of oil and allowing the same to stand until the calcium sulphate and precipitated impurities have separated from the oil, the proportion of calcium sulphate required to clarify the oil being determined by the extent of precipitation of the solids as the calcium sulphate is deposited into the oil, and finally separating said solids from the oil.

3. The method of treating oils to remove solids which are mechanically suspended therein comprising bringing the oil into contact with gypsum unassociated with other materials so as to attract the suspended solid particles and render them readily separable from the oil, the proportion of gypsum required to clarify the oil being determined by the extent of precipitation of the solids as the oil and gypsum are brought into contact, and finally filtering the oil to separate said solids therefrom.

In testimony whereof I have hereunto set my hand.

HENRY H. MORETON.